Figure 1A:
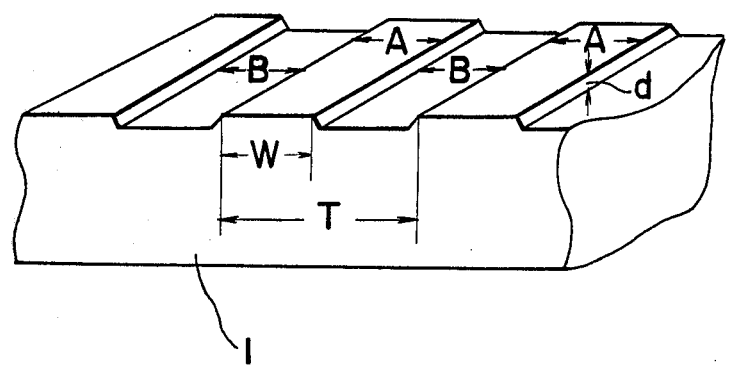

United States Patent [19]

Akahira et al.

[11] 4,385,303
[45] May 24, 1983

[54] OPTICAL RECORDING AND REPRODUCING DISC

[75] Inventors: Nobuo Akahira, Yahata; Michiyoshi Nagashima, Hirakata; Shunji Harigae, Nara; Tomio Yoshida, Katano; Tadaoki Yamashita, Hirakata, all of Japan

[73] Assignee: Matsushita Electric Industrial Co., Ltd., Kadoma, Japan

[21] Appl. No.: 254,276

[22] Filed: Apr. 15, 1981

[30] Foreign Application Priority Data

Apr. 15, 1980 [JP] Japan ................................ 55-49714

[51] Int. Cl.³ .............................................. G01D 15/34
[52] U.S. Cl. .................................. 346/137; 346/76 L; 369/278; 369/280
[58] Field of Search .................. 346/135.1, 137, 76 L; 358/128.5; 369/275, 278, 279, 280, 284

[56] References Cited

U.S. PATENT DOCUMENTS

| | | | |
|---|---|---|---|
| 3,373,997 | 3/1968 | Berndt | 369/14 X |
| 3,902,010 | 8/1975 | Goshima | 369/279 X |
| 4,005,259 | 1/1977 | Kaneko | 369/109 |
| 4,037,251 | 7/1977 | Bricot | 369/109 |

Primary Examiner—Joseph W. Hartary
Attorney, Agent, or Firm—Wenderoth, Lind & Ponack

[57] ABSTRACT

An optical recording and reproducing disc for recording and/or reproducing information by the application of laser beams having a wavelength λ in the range of 0.7 to 1.0 μm, the disc being constituted by a disc-shaped base having at least one spiral guide track thereon with top surfaces parallel to the surface of the base at a height above the base different from the top surfaces of the portions of the base between the spires of the track, which height is in the range of λ/12 to λ/6, the guide track having a width approximately equal to the effective diameter of the laser beams; and a uniform thickness coating of a light recording material on the top surface of the guide track and the portions of the base between the spires of the guide track, the light recording material being a material the transmittance and/or the reflectance of which is varied by irradiation by the laser beams.

7 Claims, 8 Drawing Figures

OPTICAL RECORDING AND REPRODUCING DISC

The present invention relates to a disc for optical recording reproduction and more particularly, a disc for optical recording and reproduction wherein a beam modulated by the information signal such as an image signal or the like is applied to a recording medium in the form of a recording film which changes in reflectance or transmittance due to temperature change caused by the beam application.

In recent years, in addition to an optical video disc used exclusively for reproduction, a disc for optical recording and reproduction wherein the reproduction can be performed immediately by a semiconductor laser, etc. has been in development. Most of the developments are based on a system of drilling a hole in the recording film by laser generated heat to form the recorded bits, as disclosed in Japanese Patent Laid Open Publication No. 11430/1977. In addition, a group to which the present inventors belong developed other recording films, for instance, a method of using a sub-oxide film as a recording medium, such as thin film composed of a sub-oxide such as tellurium. In this method the film composed of the sub-oxide of the tellurium on the base plate absorbs the laser beam so as to change the refractive index and the optical density due to the heat thus generated, and the quality of the beam reflected from the surface of such a film substantially changes.

According to the drilling system of the former method, the film has holes drilled therein due to the evaporation or melting of the film by the laser beam. Thus, a great amount of laser power is required and a hollow disc construction for providing a shelter for evaporated material is required to be provided. The thin film of the latter method has advantages in that the recording operation and the erasing operation can be performed with relatively lower power than is needed for the former method. However, the latter method has many problems yet to be overcome. Cracks may be caused in the recording film due to a decrease in the recording power and the heat during the recording operation, or incomplete erasing may occur during the erasing operation. These problems of the latter method are required to be overcome.

Accordingly, an object of the present invention is to provide a new disc which is free from the above-described problems, which is superior in terms of recording efficiency and recording bit positional accuracy.

Another object of the present invention is to provide an optical disc having recording film thereon, which changes in beam reflectance or beam transmittance without any accompanying geometrical deformation, due to the raised temperature which occur at the time of laser beam application, the film being formed on a disc-shaped base having geometrically rugged guide tracks formed thereon in advance.

A further object of the present invention is to provide an optical recording disc to which focused laser beams are applied to record information, and in which concentrically or spirally convex or concave guide grooves are formed in advance on a disc-shaped resin base material of acryl or the like, and on which a recording film the reflectance or transmittance of which is changed by the application of the light the film being provided on the entire surface of the guide grooves.

A still further object of the present invention is to provide an optical recording disc to which focussed laser beams are applied to record the information, and in which the guide grooves comprising geometrically rugged guide tracks are formed in advance on a disc-shaped resin base material of acryl or the like and on which a recording film is formed, the film thickness of the film on the different parts being such as to considerably improve the recording sensitivity and to eliminate the cracking during the recording operation, and the relationship between the groove width and the laser beam diameter being such as to increase the recording efficiency and avoid unerased portions being left after erasing.

Figure 1B:
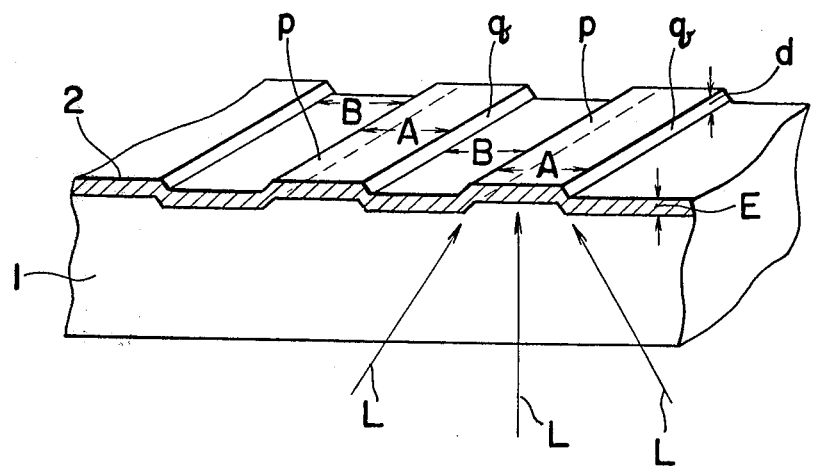
Figure 3A:
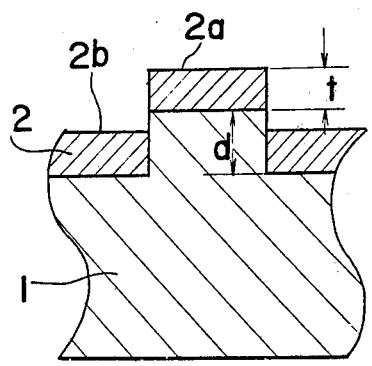
Figure 3B:
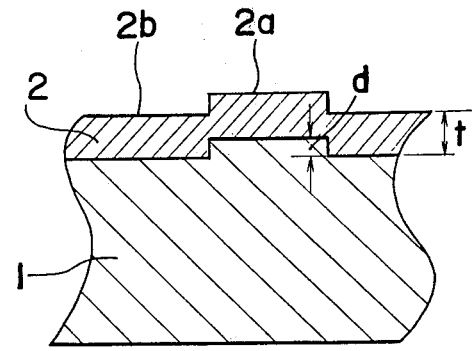
Figure 4:
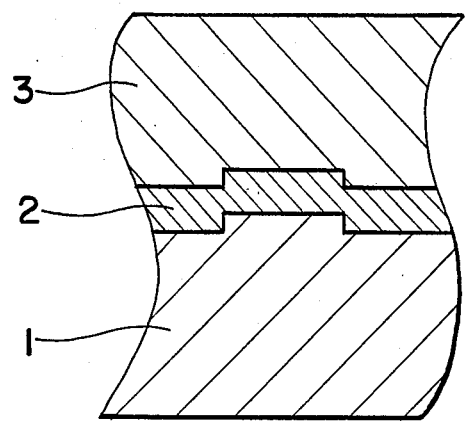
Figure 5:
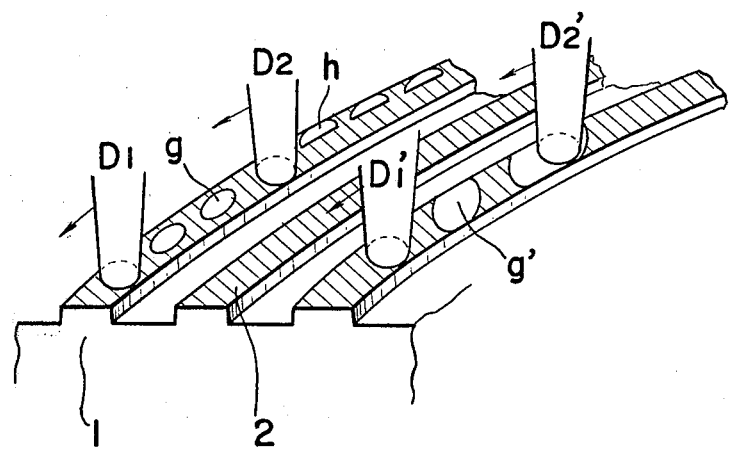

These and other objects and features of the present invention will become apparent from the following description of a preferred embodiment thereof taken in conjunction with the accompanying drawings, in which;

FIGS. 1(a) 1(b) are partial sectional views for illustrating the construction of an optical recording disc in accordance with the present invention, FIGS. 2(a) 2(b), FIGS. 3(a) 3(b) and FIG. 4 are partial sectional views showing the construction of some embodiments of a disc in accordance with the present invention, respectively, and FIG. 5 is a perspective view for illustraing the relation between the applied recording beam and the guide track width in a disc for optical recording and reproduction in accordance with the present invention.

Before proceeding with the description of the present invention, it is to be noted that the like parts are designated by like reference numerals throughout the accompanying drawings.

FIG. 1(a) shows one example of a disc base material 1, here shown with the rear side up, which is provided with concave, with respect to the rear side, optical guide grooves B. (FIG. 1(a) shows, in a partial enlarged section, the disc base material, and a convex recording track A shown in FIG. 1(a) is formed, in concentric or spiral shape, almost uniformly on the entire face of at least an area one side of the medium 1, the rear in FIG. 1(a), for recording signals the grooves B constituting portions of the base between the tracks A. The width W of the track A is different depending upon the wavelength of the light source to be used or the degree of coherency thereof. When a semiconductor laser of approximately 8000 Å in wavelength is used as a light source, a width of approximately 0.7 to 1 $\mu$m is preferable. Reference character T shows the track pitch of the tracks A which is prescribed by the content of the signal to be recorded and reproduced and the amount of the crosstalk of the signals which can be tolerated between the tracks. The track pitch T is approximately 1.4 to 2.0 $\mu$m. The height difference d between a track A and an adjacent groove B, which is located between adjacent tracks, is 1/6 to 1/12 of the wavelength $\lambda$ of the incident light so that an asymmetrical diffraction effect is provided with respect to light, which is applied to the track A. The disc base material 1, which is provided with such concave-shaped guide grooves B can be made by the art of making a conventional video disc.

FIG. 1(b) shows a layer 2 of a light sensitive recording material (hereinafter referred to as the light recording material) of uniform thickness on the track and groove surfaces of the disc base material 1 shown in the FIG. 1(a). The light recording material 2 has a thickness in the range of several hundreds Å to two thousands Å, although the thickness can differ depending upon the types of the recording materials. Referring to FIG. 1(b), the recording light L which is incident from the front side of the base material is a focused light beam having a diameter at the recording track equal to 0.7 to 1.0 μm (the width of the recording track A) or more. When the dimension d between the surface of the material 2 on track A and the material 2 in the groove B on the disc is kept in the above-described range of λ/6 through λ/12 the edge faces p and q of the track A will cause an asymmetrical diffraction effect in a direction normal to the track A with respect to the axis of the incident light, and the far field pattern of the light reflected from the face of the light recording material provides a better representation of the positional shift normal to the track between the recording light and the track A so that tracking error signals can be obtained. Accordingly, the track of FIG. 1(b) can be followed with a tracking mirror. As the base material 1, a material, which is optically homogeneous and transparent, such as polymethyl (PMMA) resin, polyvinyl chloride resin or the like can be used.

The method of forming the guide grooves B from these resins can be a conventional method of making a video disc. Namely, grooves are formed by a hot press method or an injection method or the like. The groove layer can be provided on the base material 1 using these resins with the other resins such as ultraviolet hardening resin. The recording 2 can be a sub-oxide light absorbing film such as film composed of TeOX ($x \approx 1$). The film can be formed by a vacuum evaporated method to a given thickness independently of the ruggedness of the base material.

The effects to be produced from the construction and the construction for producing the effects to a maximum will be described hereinafter in detail.

Figure 2A:
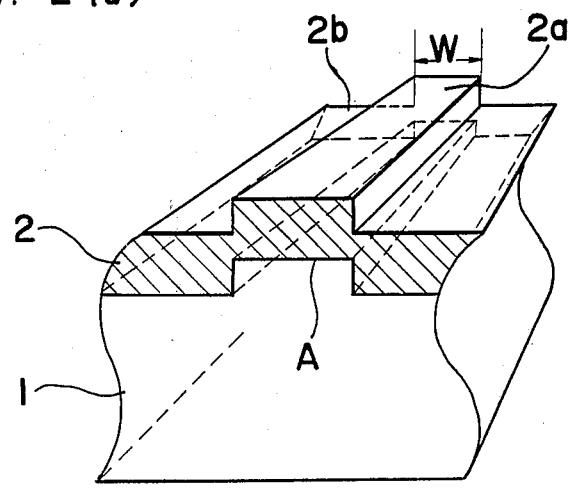

FIG. 2(a) shows a construction corresponding to that of FIG. 1(b). Referring to FIG. 2a, a laser beam is applied to the recording film 2a disposed on the convex, relative the rear side, portion A, which constitutes the recording track of the base material 1. The recording film 2a absorbs the laser light which causes an increase in the temperature. The quantity of heat produced at this time moves to the other portion of the base material and the recording film 2b to escape. The difference in the levels of corresponding surfaces between the portion 2a and a portion 2b reduces, or in the case of FIG. 3(a) eliminates, the cross section of the recording film, and reduces or substantially blocks this escape of heat. If the disc merely has a recording film formed on a flat base having no grooves therein, the heat generated in a film when struck by laser light escapes in all the directions through the recording film, with the result that the efficiency of temperature increase from application the laser beam is inferior. The thermal conductivity of the recording film is 10 times or 100 times that of the resin base, so little heat escapes through the base. Since the difference in height between portions of the film is caused by the grooves, it is correspondingly difficult for the heat to escape, with the result that the temperature is easily raised at the position of application of the laser light. Thus operation can be carried out with less laser power. According to the experiments of the inventors, cracks were caused in the film due to the raised temperature of the film during the recording operation in a flat base having no grooves. However, no cracks were caused at all in the grooved disc of the present invention. The recording film with surfaces at different levels has the effect of reducing the thermal distortion of the recorded information.

Figure 2B:
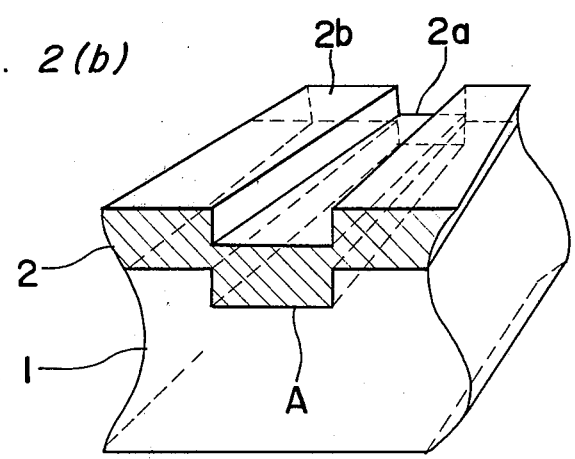

The track width W which is most effective for raising the temperature due to the action of the laser beams, will be described hereinafter. A convex with respect to the rear side, shape having a constant width and sufficiently long in length and constituting a track A formed in concentric circle or spiral, will be described. The width W must be sufficiently greater than the spot of the beam to be applied. Since the amount of film material in the track A per unit length becomes smaller as the width W becomes narrower, the thermal capacity per unit length is also reduced, so that the temperature is more easily raised. Also, since the contact area between the recording film and the base plate becomes smaller as the information track width W becomes narrower, the thermal transfer to the base plate becomes smaller. The temperature rise is better when the guide track width W is the same as the thickness ω of the light beam or is somewhat smaller than that. Namely, under the condition ($\omega \geq W$), the effect of the beam is greater. The thickness ω of the light beam means effective beam diameter which has sufficient strength to change the characteristics of a recording material within the area beam application during the time on signals are impressed on the beam. The effect is the same even when the guide track A is concave relative to the rear side, as shown in FIG. 2(b) i.e. is a groove with the raised ridges between the grooves being portions of the base between the tracks. Particularly, when the thermal conductivity of the base material is sufficiently smaller than that of the recording film, there is no difference between the convex shape shown in FIG. 2(a) and the concave shape shown in FIG. 2(b). When the width W of the track becomes narrower than the effective beam diameter W, difficulty is caused in reproduction. Namely, the amount of reflected or transmitted light caused by signals recorded on the track is reduced, thus resulting in a reduced S/N ratio. Generally, speaking, the width of guide track A is optimum when it is approximately as wide as or slightly narrower than the effective beam diameter. To achieve an desired object, the width of the guide track A is required to be in the range of ±20% of the effective beam diameter and is preferable in the range of ±10% of the effective beam.

The relationship between the thickness t of the recording film and the depth (height) d between the surfaces of the base material 1 on the track and the groove will be described hereinafter. When the relationship of $t \leq d$ exists as shown in FIG. 3(a), the heat conduction within the recording film is cut off at the gap between the portions of the light recording material, and thus the above-described effect is greatest. Even when the relation of $t > d$ exists as shown in FIG. 3(b), the adiabatic effect can be expected except when t is sufficiently larger than d. Particularly, in the case of $t \leq 2d$, the heat conduction of the recording film at the point of the difference in height becomes half or less of the heat conduction of a flat uniform thickness film, so that the effect is large. Thus the recording film is preferably at least two times as thick as the difference in height between the bottom of the groove and the top of the track.

In one embodiment of the new disc construction described hereinabove, PMMA 1 mm thick was used as a grooved base material. The difference in height was 700 Å, the width of the concave portion was 8000 Å, the evaporated recording film was TeOX (x≈1) and was 1400 Å in thick. When a recording operation was performed with a semiconductor laser, which was focused to a spot of approximately 8000 Å diameter by an optical system of Na=0.5, the recording operation could be effected by a laser power of approximately three fifths that needed for a non-grooved base material.

An example where a protective layer has been coated on the recording film for the construction of a practical disc will be described hereinafter. FIG. 4 shows such embodiment wherein the recording film 2 is covered with the protective layer 3 for the purpose of mechanical protection. Even in this case, geometrical convexities and concavities are provided on the base material 1 as shown in the drawing, and the thermal conductivity of the protective member 3 is sufficiently low to improve the recording sensitivity. An optically homogeneous resin such as polystyrene having a thermal conductivity of from 0.8 to $1.2 \times 10^{-3}$ J/cm sec.° K. is dissolved in a aromatic solvent or the like such as xylene and is coated on the recording film 2 and dried to form the protective layer 3. When such an adhering protective layer is to be provided, deformation and evaporation can not be used in recording material on the recording film by laser beams. Only the method of varying the optical condition, such as the reflection factor, without change in the shape of the recording film 2 can be used. Generally, the recording film is extremely thin, for example approximately 1000 Å thick. Since the film is heated during the recording operation, it is likely to be oxidized if it is exposed to air. Once it is oxidized, the transmission factor becomes lower in that portion. Transparency is distributed in accordance with the distribution of the temperature near the recorded bit. Thus blurring is caused in the vicinity of the recorded bit. This causes the S/N ratio to decrease FM type recording. However, the adherent protective layer can prevent such oxidization.

Since a certain composition of the low oxide film of tellurium described hereinabove as the recording film has a property which permits it to be erased under certain conditions, as disclosed in the Japanese Pat. No. 3725/1979. The member is whitened at a portion where a slightly strong beam from the semiconductor laser is applied and is blackened at a portion where a beam weaker than the slightly strong beam is applied. Also, the whitening and blackening can be obtained by variation of the laser pulse width. Namely, the member is whitened by a short time application of a beam of 100 nsec. or less and is blackened by a long time application of a beam of 200 nsec or more. This whitening operation and blackening operation can be repeatedly performed.

FIG. 5 is a view illustrating an embodiment of record erasure in such erasing disc as described hereinabove. Referring to FIG. 5, the base material is generally indicated by reference numeral 1. A film for recording and erasing is generally designated by reference number 2. A laser beam generally designated by $D_1$ is provided for the writing-in operation and has a diameter less than the width of the convex-shaped guide track. A laser beam for erasure and which is narrower than the guide track is generally represented at $D_2$. Also, reference character g designates a white bit signal written in by beam $D_1$. Reference character h designates a portion of the white bit signal not erased. When the laser beam diameter is less than the track width, portions of recorded bits are left unerased due to some shifting of the erasing laser beam $D_2$ during relative movement of the track and the erasing beam $D_2$. FIG. 5 also shows beams $D_1'$ and $D_2'$ and recorded bits g' corresponding to the above-described beams $D_1$ and $D_2$ and bits g. The diameter of the latter laser beam is almost the same as the width W of the guide track or is slightly greater. In this case, unerased portions are not left, since the laser beams cover the entire width of the track. The beam diameter $\omega$ is greater than the groove width W as described hereinabove to achieve complete erasing.

Accordingly, the disc according to the present invention can, due to the presence of the grooves and the difference in level of the surfaces of the recording material film, considerably improve the recording sensitivity and eliminate the cracking during the recording operation. In addition, when the relationship between the groove width and the laser beam diameter is properly, the recording efficiency can be increased and unerased portions of the recorded bits eliminated.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. An optical recording and reproducing disc for recording and/or producing information by the application of laser beams having a wavelength λ in the range of 0.7 to 1.0 μm, said disc comprising:
   a disc-shaped base, said base having at least one spiral guide track thereon with top surfaces parallel to the surface of the base at a height above the base different from the top surfaces of the portions of the base between the spires of said track, which height is in the range of λ/12 to λ/6, said guide track having a width approximately equal to the effective diameter of the laser beams; and
   a uniform thickness coating of a light recording material on said top surface of said guide track and said portions of said base between the spires of said guide track, said light recording material being a material the transmittance and/or the reflectance of which is varied by irradiation by the laser beams.

2. A disc as claimed in claim 1 in which said base is transparent, whereby said laser beams can be directed at said light recording material through said base.

3. A disc as claimed in claim 1, further comprising a transparent protective layer having a thermal conductivity less than that of said light recording material and placed over said coating of light recording material.

4. A disc as claimed in claim 1 in which said light recording material is coated on said base in a thickness no greater than two times the difference in height between the top surface of said guide track and the surface of the portions of said base between the spires of said track.

5. A disc as claimed in claim 1 in which the width of said guide track is in the range of ±20% of the effective diameter of said laser beams.

6. A disc as claimed in claim 1 in which said guide track comprises a convex portion on said base.

7. A disc as claimed in claim 1 in which said guide track comprises a concave groove on said base.

* * * * *